United States Patent
Hoshihara et al.

[19]

[11] Patent Number: 5,816,656
[45] Date of Patent: Oct. 6, 1998

[54] SEAT RECLINING DEVICE

[75] Inventors: Naoaki Hoshihara, Aichi pref.; Yukifumi Yamada, Toyota, both of Japan

[73] Assignee: Aisin Seiki Kabushiki Kaisha, Japan

[21] Appl. No.: 917,893

[22] Filed: Aug. 27, 1997

[30] Foreign Application Priority Data

Aug. 29, 1996 [JP] Japan ..................................... 8-228990

[51] Int. Cl.⁶ ..................................................... B60N 2/02
[52] U.S. Cl. ..................................... 297/367; 297/216.12
[58] Field of Search ............................... 297/367, 378.12, 297/216.13, 216.14

[56] References Cited

U.S. PATENT DOCUMENTS

| | | | |
|---|---|---|---|
| 4,348,050 | 9/1982 | Letoumoux | 297/367 |
| 4,384,744 | 5/1983 | Barley | 297/367 |
| 5,611,599 | 3/1997 | Baloche et al. | 297/367 |
| 5,622,407 | 4/1997 | Yamada et al. | 297/367 X |
| 5,690,386 | 11/1997 | Chabanae | 297/367 |

FOREIGN PATENT DOCUMENTS

63-234915  9/1988  Japan .

Primary Examiner—Peter R. Brown
Attorney, Agent, or Firm—Finnegan, Henderson, Farabow, Garrett, & Dunner, L.L.P.

[57] ABSTRACT

A seat reclining device includes a control shaft connectable to an operation member, a lower arm connectable to one side of a seat cushion, an upper arm connectable to one side of a seat back which is able to be inclined relative to the lower arm, a pair of seat declining mechanisms each of which includes an opposite lower arm connectable to the other side of the seat cushion, an opposite upper arm connectable to the other side of the seat back which is able to be inclined relative to the opposite lower arm, the control shaft being inserted through the opposite lower arms and the opposite upper arms, each of the seat reclining mechanisms including a cam member connected to the control shaft to be rotated with the control shaft and a pawl member slidably disposed in one of the opposite lower arm and the opposite upper arm, the pawl member abutting on the cam member to be slid by the rotation of the cam member, the pawl member being engageable with a ratchet portion disposed on the other of the opposite lower arm and the opposite upper arm.

2 Claims, 8 Drawing Sheets

SEAT RECLINING DEVICE

BACKGROUND OF THE INVENTION

1. Field of the Invention

This invention relates to a seat reclining device, and, more particularly, to a seat reclining device for a vehicle.

2. Description of the Related Art

Figure 8:
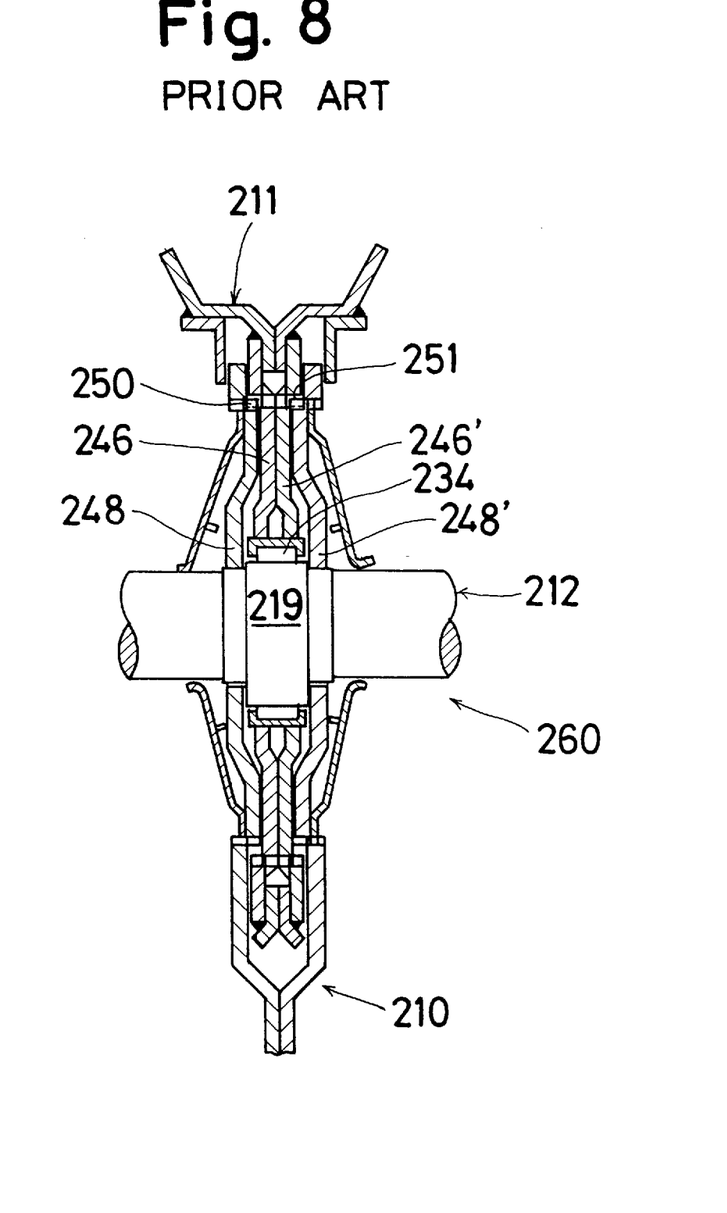
FIG. 8 is a sectional view of the seat reclining device of the prior art.

A conventional seat reclining device, as shown in FIG. 8 of the accompanying drawings, is disclosed in Japanese Patent Laid Open No. 63 (1988)-234915. The seat reclining device disclosed in the publication comprises a seat reclining mechanism 260 having an upper arm 211 connected to a seat back, and a lower arm 210 connected to a seat cushion. The upper arm 211 includes a pair of plate members 246, 246'. The lower arm 210 has a pair of plate members 248, 248' sandwiching the plate members 246, 246' of the upper arm 211. The upper arm 211 is supported by an eccentric portion 219 of a control shaft 212 through a bearing member 234. The lower arm 210 includes a pair of outer tooth portions 250, each of having a plurality of outer teeth. The upper arm 211 includes a pair of inner tooth portions 251, each having a plurality of inner teeth engaged with the outer teeth on the outer tooth portion 250 of the lower arm 210. The number of the inner teeth on the inner tooth portion 251 of the upper arm 211 is at least one more than that of the outer teeth on the outer tooth portion 250 of the lower arm 210.

In this seat reclining device of the prior art, since the upper arm 211 is inclined relative to the lower arm 210 by a planetary movement of the inner tooth portions 251 of the upper arm 211, the control shaft 212 must be rotated through a large number of turns in order to incline the upper arm 211 at a wide angle relative to the lower arm 210. Therefore, it is difficult to incline the upper arm 211 rapidly through a wide angle relative to the lower arm 210.

Further, the lower arm 210 and the upper arm 211 must be precisely manufactured in order to maintain a predetermined inclined angle of the upper arm 211 relative to the lower arm 210.

SUMMARY OF THE PRESENT INVENTION

It is an object of the present invention to provide a seat reclining device which has high strength to withstand force applied to the seat back.

It is another object of the present invention to provide a seat reclining device which is small in size.

It is further object of the present invention to provide a seat reclining device which is low in cost.

It is a further object of the present invention to provide a seat reclining device which is simple in structure.

It is a further object of the present invention to provide a seat reclining device which has durability.

The objects, advantages and purpose of the invention will be set forth in part in the description which follows, and in part will be obvious from the description, or may be learned by practice of the invention. The objects, advantages and purpose of the invention will be realized and attained by means of the elements and combinations particularly pointed out in the appended claims.

To attain the objects and advantages, and in accordance with the purpose of the invention, as embodied and broadly described herein, the seat reclining device of the invention comprises a lower arm connectable to one of opposite sides of a seat cushion, an upper arm connectable to the lower arm and to one of opposite sides of a seat back capable of inclination relative to the lower arm, a pair of seat reclining mechanisms on the other of the opposite sides of the seat cushion and seat back, each of the pair of seat reclining mechanisms including an opposite lower arm connectable to the other side of the seat cushion, an opposite upper arm connectable to the other side of the seat back and capable of inclination relative to the opposite lower arm; and a control shaft is inserted through the opposite lower arms and the opposite upper arms, each of the pair of seat reclining mechanisms including a cam member connected to and for rotation with the control shaft, and a pawl member slidably disposed in one of the opposite lower arm and the opposite upper arm, the pawl member abutting the cam member to be slid by the rotation of the cam member, and the pawl member being engageable with a ratchet portion on the other of the opposite lower arm and the opposite upper arm.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an exemplary embodiment of the invention and together with the description, serve to explain the principles of the invention. In the drawings.

DETAILED DESCRIPTION OF PREFERRED EMBODIMENT

Reference will now be made in detail to the present preferred embodiment of the invention, an example of which is illustrated in the accompanying drawings. Wherever possible, the same reference characters will be used throughout the drawings to refer to the same or like parts.

Figure 1:
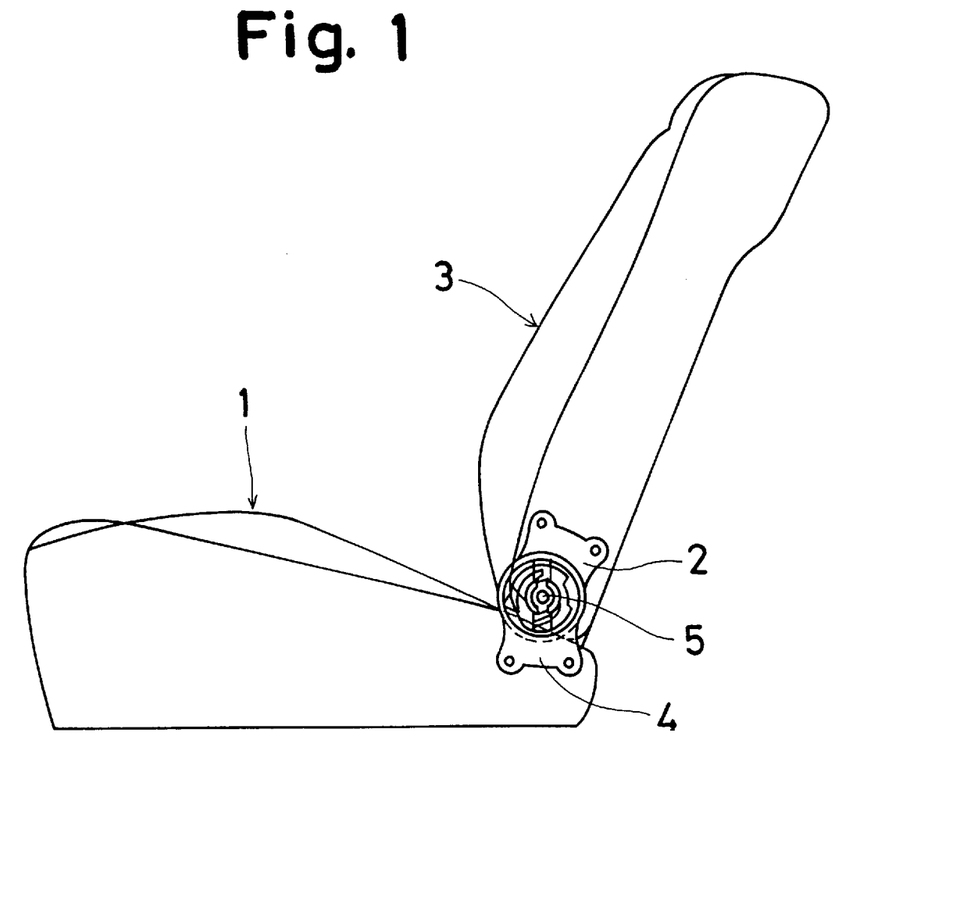
FIG. 1 is a side view of a seat on which the seat reclining device of the present invention is mounted.

As shown in FIG. 1, an upper arm 2 is connected to a seat back 3 and a lower arm 4 is connected to a seat cushion 1. A control shaft 5 is inserted through the upper arm 2 and the lower arm 4.

Figure 6:
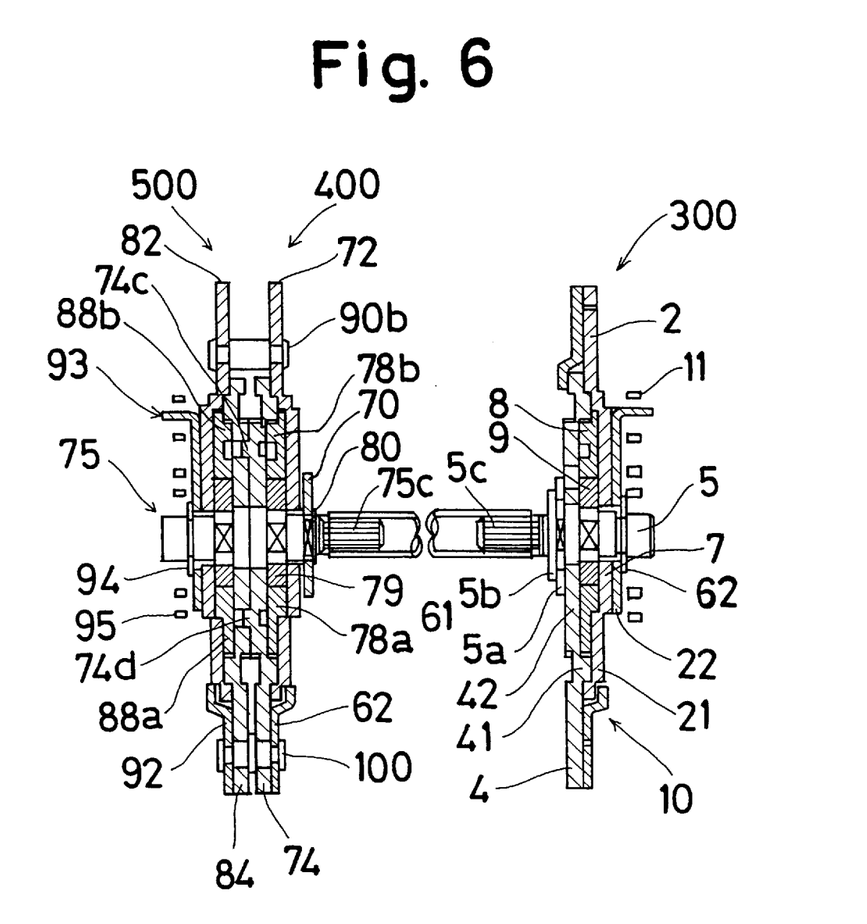
FIG. 6 is a sectional view of the seat reclining device of the present invention.

A construction of a seat reclining mechanism 300 disposed on one side of the seat reclining device of the present invention will now be described with reference to FIGS. 2–4 and 6 of the drawings. The control shaft 5 is rotatably inserted through the upper arm 2 and the lower arm 4. The upper arm 2 is rotatable about the control shaft 5 relative to the lower arm 4 through a guide mechanism 10 (FIG. 6). The guide mechanism 10 is formed with a concave portion 21 and a convex portion 41 which are engaged with each other. The concave portion 21 and the convex portion 41 are pressed into the upper arm 2 and the lower arm 4, respectively, to provide complementing radial and axial surfaces between the upper arm 2 and the lower arm 4.

Shaft supporting portions 22, 42 are disposed around portions of the upper arm 2 and the lower arm 4 respectively to provide openings in the upper arm 2 and the lower arm 4 through which the control shaft 5 is inserted. A space 7, surrounding the control shaft 5, is formed between the upper arm 2 and the lower arm 4 by the shaft supporting portions 22 and 42.

A ratchet 23 is formed on the upper arm 2 to be exposed to the space 7. A pair of guide wall surfaces 43, 44, which are exposed to the space 7, are formed on the lower arm 4 to be located between the ratchet 23 and the control shaft 5.

The ratchet 23 includes tooth portions 23a and 23b formed in arc shaped configuration about the control shaft 5. The guide wall surfaces 43, 44 are on opposite sides of the control shaft 5 and are parallel to each other. The upper arm 2 includes a pair of stopper walls 24, 25 on the shaft supporting portions 22. The stopper walls 24, 25 on the upper arm 2 are exposed to the space 7 and are located on opposite sides of the guide wall surfaces 43, 44 on the lower arm 4.

A pair of pawl members 8 and a cam member 9 are disposed in the space 7. Each of the pawl members 8 includes a main portion 8d formed in a substantially rectangular shaped configuration. The pawl members 8 are located on diametrically opposite sides of the control shaft 5. The pawl members 8 are disposed between the guide wall surfaces 43, 44 of the lower arm 4 with a predetermined clearance to the guide wall surfaces 43, 44 to slide in a radial direction relative to the control shaft 5.

Each of the pawl members 8 includes a tooth portion 8a which is disposed on one of side thereof opposite to the respective tooth portions 23a, 23b of the ratchet 23 to be engageable therewith by sliding movement of the pawl member 8. Further, the pawl member 8 includes a cam surface 8b disposed on the side thereof opposite to the the tooth portion 8a.

The cam member 9 includes a pair of convex lobe portions 9a located opposite to the cam surfaces 8b of the pawl members 8. When the cam member 9 is rotated in a counter clockwise direction in FIG. 2, the convex lobe portions 9a press the cam surfaces 8b of the pawl members 8 to slide the pawl members 8 along the guide wall surfaces 43, 44 in order that each of the tooth portions 8a of the pawl members 8 engages with the tooth portion 23a of the ratchet 23.

Each of the pawl members 8 includes a cam channel 8c on the portions 9b extended around the control shaft 5 to be engageable with the cam channels 8c. When the cam member 9 is rotated in the clockwise direction in FIG. 2, the arm portions 9b of the cam member 9 engage with the cam channels 8c of the pawl members 8 to slide the pawl members 8 along the guide wall surfaces 43, 44 in a direction so that each of the tooth portions 8a of the pawl members 8 disengages from the tooth portion 23a, 23b of the ratchet 23.

Figure 3:
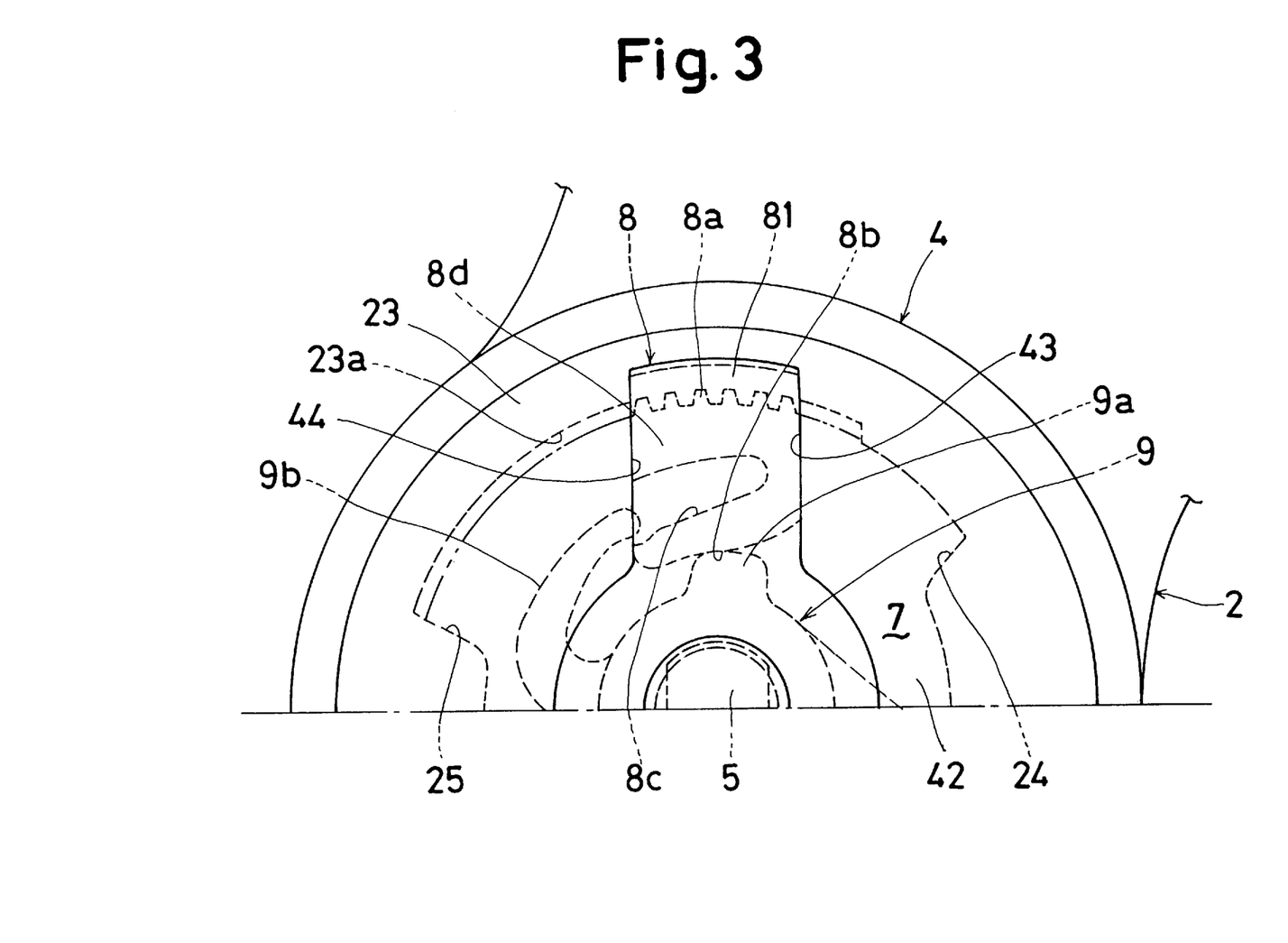
FIG. 3 is an enlarged view of details of the seat reclining device of the present invention.

As shown in FIG. 3, the guide wall surfaces 43, 44 cross the tooth portion 23a of the ratchet 23. The space 7 is extended to be opposite to the convex portion 21 of the upper arm 2 forming the guide mechanism 10.

Figure 4:
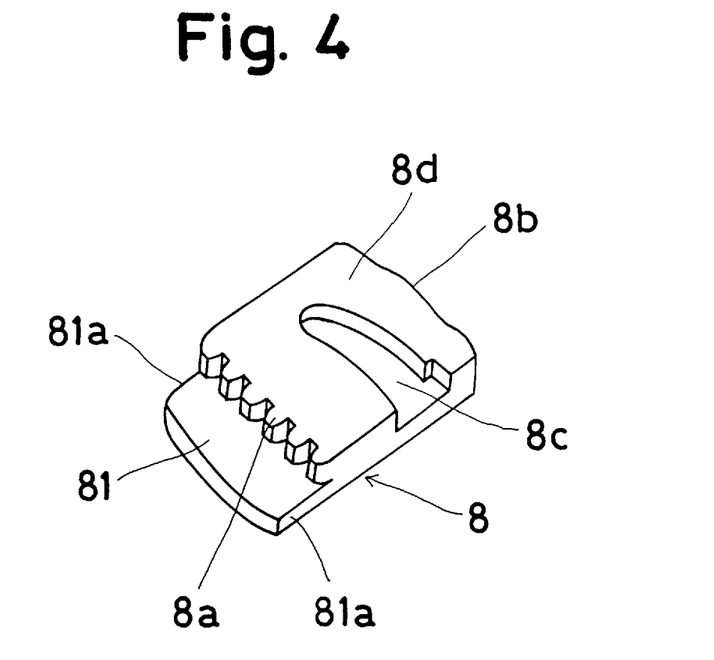
FIG. 4 is an enlarged perspective view of a pawl member of the seat reclining device of the present invention.

As shown in FIG. 4, the tooth portion 8a is formed on the pawl member 8 within half of the thickness of the pawl member 8 which abuts on the upper arm 2. A wall portion 81 is formed on the remaining half thickness of the pawl member 8 which abuts on the lower arm 4. The wall portion 81 is extended from the main portion 8d to project from the tooth portion 8a and connects the teeth of the tooth portion 8a. The pawl member 8 is engaged with the guide wall surfaces 43, 44 through a pair of side surfaces 81a extended from the main portion 8d.

Figure 2:
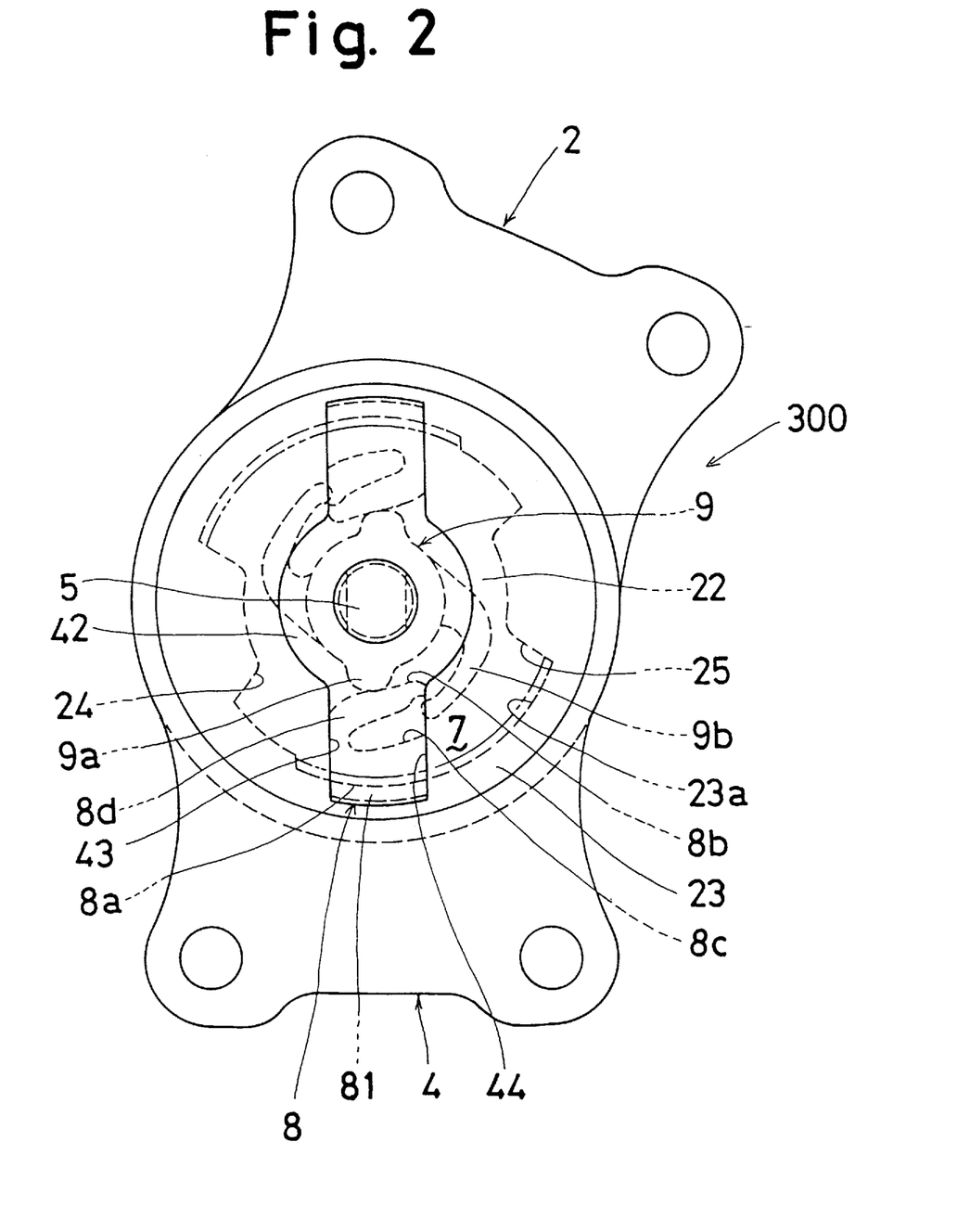
FIG. 2 is a side view of the seat reclining device of the present invention.

A spring 11 is disposed around the control shaft 5 to bias the control shaft 5 in a counter clockwise direction in FIG. 2, thereby to retain the tooth portions 8a of the pawl member 8 normally in engagement with the tooth portions 23a, 23b of the ratchet 23. One end of the spring 11 is engaged with a slit (not shown) in the control shaft 5 and the other end of the spring 11 is engaged with a member 62 of the lower arm 4 which is concentric with the control shaft 5.

Figure 7:
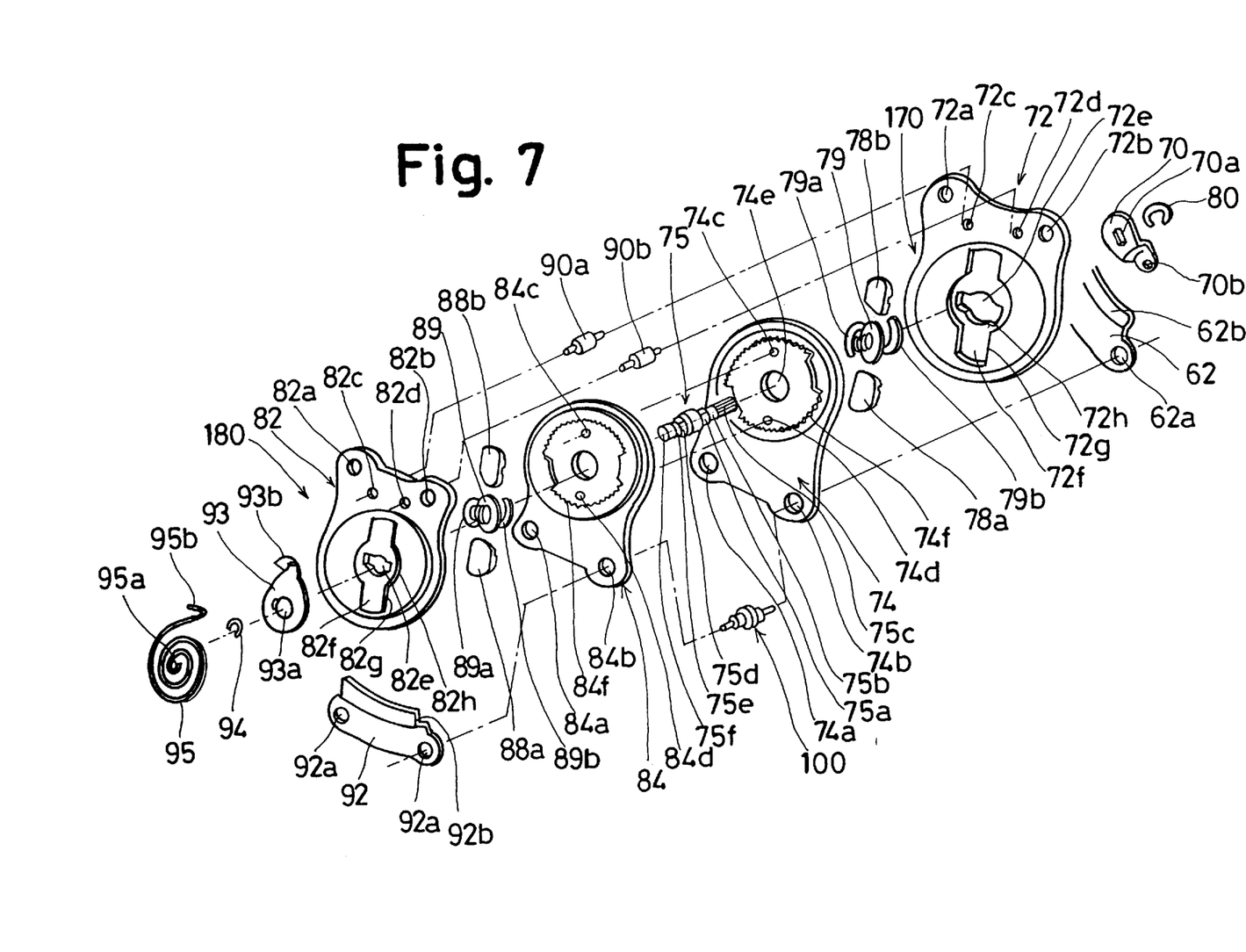
FIG. 7 is an exploded perspective view of part of the seat reclining device of the present invention.

In FIGS. 6 and 7, there is shown a construction of seat reclining mechanisms 400 and 500 disposed on the side of the seat reclining device of the present invention opposite to the described mechanism 300. The mechanism 400 will now be described.

A control shaft 75 is inserted through an upper arm 72 and a lower arm 74 to be rotatably supported by the upper arm 72 and the lower arm 74. The upper arm 72 can be rotated relative to the lower arm 74 through the guide mechanism 170. The guide mechanism 170 is formed with a concave portion 72f and an opening 72e. The concave portion 72f is formed on the upper arm 72 by pressed displacement into the upper arm 72. The concave portion 72f is formed with a pair of rectangular portions 72g and a circular portion 72h. The rectangular portions 72g are disposed on diametrically opposite sides of the control shaft 75.

The lower arm 74 includes a ratchet 74f, which is formed by pressing the lower arm 74, and a pair of pins 74c, 74d. When the upper arm 72 and the lower arm 74 are engaged with each other, a space is formed between the upper arm 72 and the lower arm 74, in which a pair of pawl members 78a, 78b and a cam member 79 are installed. The ratchet 74f includes a pair of tooth portions which are located to lie in an arc about the control shaft 75.

The pawl members 78a, 78b are slidably installed in the rectangular portions 72g of the upper arm 72. Each of the pawl members 78a, 78b includes a tooth portion on one of side thereof opposite to the tooth portion of the ratchet 74f to be engageable with the ratchet 74f upon sliding movement of the pawl members 78a, 78b. Further, each of the pawl members 78a, 78b includes a cam surface, having the same function as the cam surface 8b in FIG. 2, and which is disposed on the side thereof opposite the tooth portions.

The cam member 79 includes a pair of convex lobe portions opposed to the cam surfaces of the pawl members 78a, 78b. The control shaft 75 is connected to the cam member 79 through a non-circular shaped portion 75a. When the cam member 79 is rotated in a clockwise direction, in FIG. 7, the convex lobe portions of the cam member 72 press the cam surfaces of the pawl members 78a, 78b to slide the pawl members 78a, 78b along the rectangular portions 72g so that each of the tooth portions of the pawl members 78a, 78b engages with the tooth portion of the ratchet 74f.

Further, the cam member 79 includes a pair of arm portions 79a, 79b to engage with cam channels disposed on the pawl members 78a, 78b in the same manner as the cam channels 8c in FIG. 4. When the cam member 79 is rotated in the counter clockwise direction in FIG. 7, the arm portions 79a, 79b of the cam member 79 engage with the cam channels of the pawl members 8a, 78b to slide the pawl members 78a, 78b along the rectangular portions 72g in a direction so that each of the tooth portions of the pawl members 78a, 78b disengages from the tooth portion of the ratchet 74f.

The remaining construction of the pawl members 78a, 78b and the cam member 79 is the same as the pawl members 8 and the cam member 9 described above.

A construction of a seat reclining mechanism 500 located on the same side of the seat reclining device of the present invention as the mechanism 400, will now be described with reference to FIGS. 6 and 7.

The control shaft 75 is inserted through an upper arm 82 and a lower arm 84 to be rotatably supported by the upper arm 82 and the lower arm 84. The upper arm 82 can be rotated relative to the lower arm 84 through the guide mechanism 180. The guide mechanism 180 is formed with a concave portion 82f and an opening 82e. The concave portion 82f is formed with a pair of rectangular portions 82g and a circular portion 82h. The rectangular portions 82g are located on diametrically opposite sides of the control shaft 75.

The lower arm 84 includes a ratchet 84f and a pair of openings 84c, 84d. When the upper arm 82 and the lower arm 84 are engaged each other, a space is formed between the upper arm 82 and the lower arm 84, and in which a pair of pawl members 88a, 88b and a cam member 89 are installed. The ratchet 84f includes a pair of tooth portions which are located so as lie in arcs about the control shaft 75.

The pawl members 88a, 88b are slidably installed in the rectangular portions 82g of the upper arm 82. Each of the pawl members 88a, 88b includes a tooth portion on one of side thereof and opposed to the tooth portion of the ratchet 84f, to be engageable therewith by the slide movement of the pawl members 88a, 88b, and a cam surface disposed on the other side thereof, all as described with reference to FIGS. 2–4.

The cam member 89 includes a pair of convex lobe portions opposed to the cam surfaces of the pawl members 88a, 88b. The control shaft 75 is connected to the cam member 89 through a non-circular shaped portion 75d. When the cam member 89 is rotated in the clockwise direction in FIG. 7, the convex lobe portions move the cam surfaces of the pawl members 88a, 88b along the rectangular portions 82g in order that each of the tooth portions of the pawl members 88a, 88b engages with the tooth portion of the ratchet 24f.

Further, the cam member 89 includes a pair of arm portions 89a, 89b to engage with cam channels on the pawl members 88a, 88b. When the cam member 89 is rotated in a counter clockwise direction in FIG. 7, the arm portions 89a, 89b of the cam member 89 engage with the cam channels of the pawl members 88a, 88b to slide the pawl members 88a, 88b along the rectangular portions 82g and disengage each of the tooth portions of the pawl members 88a, 88b from the tooth portion of the ratchet 84f.

The remaining construction of the pawl members 88a, 88b and the cam member 89 are the same as the pawl members 8 and the cam member 9 in FIGS. 2–4.

The lower arms 74, 84 are engaged with each other through pins 74c, 74d of the lower arm 74 and the openings 84c, 84d of the lower arm 84 into which the pins 74c, 74d are fit. The pins 74c, 74d and the openings 84c, 84d are formed by the press working of the lower arms 74 84 in order to precisely locate the pins 74c, 74d, as integral projections, with the openings 84c, 84d when the ratchets 74f, 84f are formed on the lower arms 74, 84. Separate members may be attached to the lower arm 74 in order to form the pins 74c, 74d instead of the above construction.

A pair of plates 62, 92 sandwich the lower portions of the lower arms 74, 84 with arc shaped stepped portions of 62b 92b. Further, one end of a pin 90a is snugly fit into an opening 72c of the upper arm 72 and the other end of the pin 90a is snugly fit into an opening 82c of the upper arm 82. One end of a pin 90b is snugly fit into an opening 72d of the upper arm 72 and the other end of the pin 90b is snugly fit into an opening 82d of the upper arm 82.

An engaging member 93 includes an opening 93a through which the control shaft 75 is inserted, and an engaging portion 93b fixed on the upper arm 82. A ring member 94 is fit into a slot 75e of the control shaft 75 in order to prevent axial movement of the control shaft 75 relative to the upper arm 82. One end 95a of a spiral spring 95 is engaged with a slit 75f of the control shaft 75. The other end 95b of the spiral spring 95 is bent to be engaged with the engaging portion 93b of the engaging member 93. The spiral spring 95 biases the control shaft 75 in the clockwise direction in FIG. 7 in order to engage the pawl members 78a, 78b, 88a, 88b with the ratchets 74f, 84f.

A release lever 70 is connected to the control shaft 75 through a non-circular shaped opening 70a. The non-circular shaped portion 75a of the control shaft 75 is fit into the non-circular shaped opening 70a of the release lever 70. A connecting hole 70b of the release lever 70 is connected to an operation member through a wire (not shown) in order that the release lever 70 is rotated in the counter clockwise direction in FIG. 7 to rotate the control shaft 75. A ring member 80 is fit into a slot 75b of the control shaft 75 in order to prevent the control shaft 75 from being disengaged from the release lever 70. The operation lever may be connected directly to one of the control shafts 5, 75 in place of the release lever 70.

A pair of pins 100 (one of them is shown in FIG. 7) are inserted through the lower arms 74, 84. Each of the pins 100 includes a flange portion which abuts on the lower arms 74, 84 to retain the lower arms 74, 84 at a predetermined distance from each other. When each of the pins 100 is inserted through the lower arms 74, 84 and the plates 62, 92, respective end of each of the pins 100 is pressed in order to fix the lower arms 74, 84 to each other.

Figure 5:
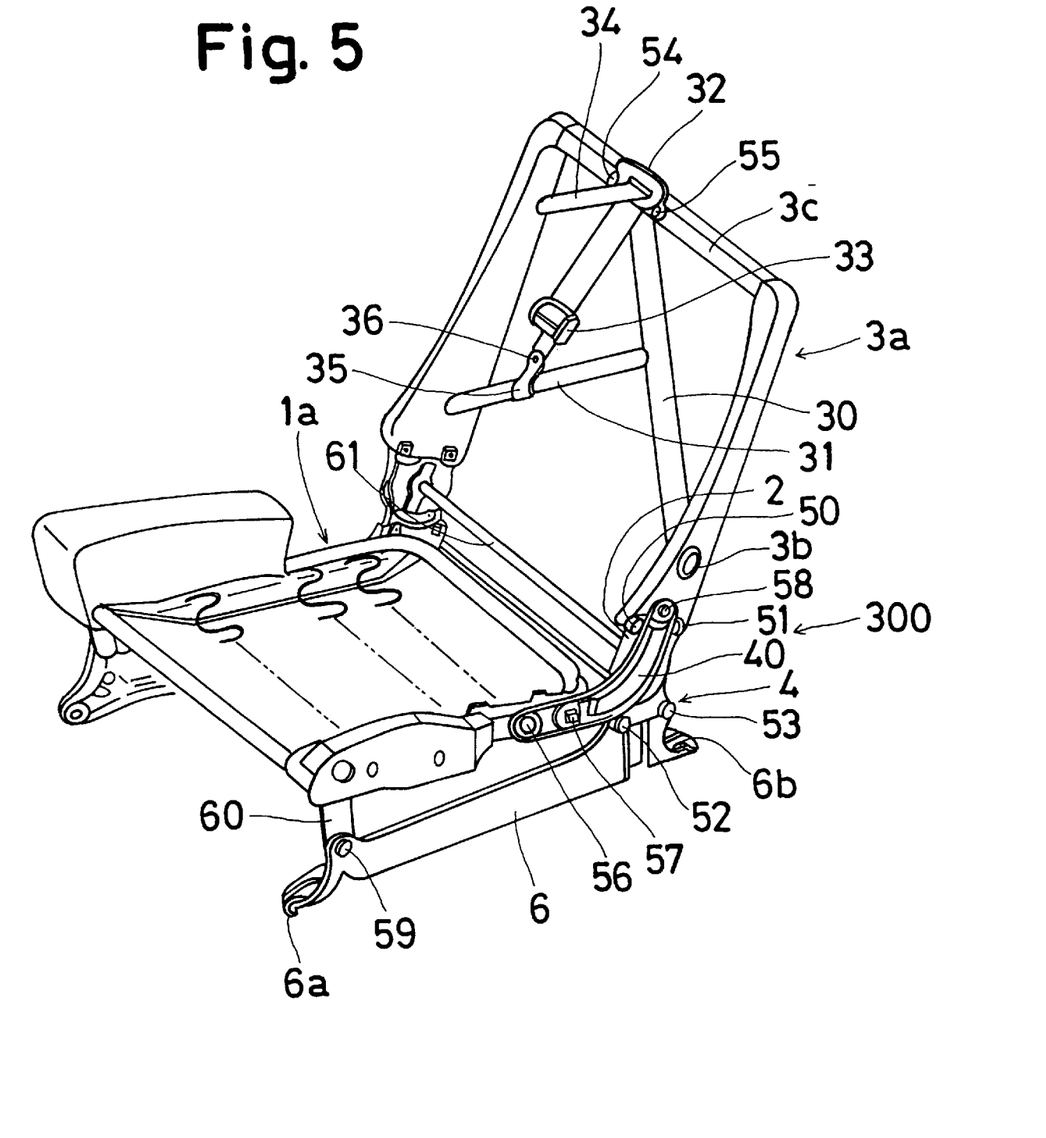
FIG. 5 is a perspective view of a seat including a seat frame on which the seat reclining device of the present invention is mounted.

The construction of a seat frame in which the reclining device of the invention is used will now be described. As shown in FIG. 5, the seat reclining mechanism 300, described above with reference to FIGS. 2–4 and 6, is disposed on the left side of a seat cushion frame 1a and the seat reclining mechanisms 400, 500 are disposed on the right side of the seat cushion frame 1a. The seat reclining mechanism 300 and the seat reclining mechanisms 400, 500 are connected each other through a connecting shaft 61. The connecting shaft 61 is a hollow member including a pair of splined portions at inner circumferential portions of both ends thereof. The connecting shaft 61 s connected to the control shafts 5, 75 of the seat reclining mechanisms 300, 400, 500 through the splined portions 5c, 75c in order to transmit the rotation equally to both of the control shafts 5, 75.

The lower arm 4 of the seat reclining mechanism 300 is fixed to a mounting member 6 through bolts 52, 53. The mounting member 6 is fixed to a vehicle floor through a pair of mounting openings 6a, 6b. The lower arm 4 may be fixed to the vehicle floor through a rail member.

A front portion of the mounting member 6 is connected to one end of a link member 60 for supporting a front portion of the seat cushion frame 1a so that the link member 60 may be rotatable about an axis 59. The other end of the link member 60 is rotatably connected to the front portion of the seat cushion frame 1a.

The seat reclining mechanisms 400, 500 are fixed to a mounting member (not shown) in the same way as the seat reclining mechanism 300 is fixed. The upper arms 2, 72, 82 are fixed to seat back frame 3a through bolts 50, 51.

The seat back frame 3a includes reinforcement members 30, 31 and a belt supporting member 32 for retaining a seat belt 34 which is fixed to an upper member 3c by bolts 54, 55. As shown in FIG. 5, when the belt supporting member 32 is fixed to a point of one third from a right end of the upper member 3c, forces applied to the upper arms 2, 72, 82 each of which is disposed on the right side and left side of the seat cushion frame 1a from the seat back 3 can be balanced.

One end of the reinforcement member 30 is fixed to a portion of the upper member 3c on which the belt supporting member 32 is mounted. The other end of the reinforcement member 30 is inserted into an opening 3b of the seat back frame 3a to be diagonally fixed to the seat back frame 3a. One end of the other reinforcement member 31 is connected to a substantially middle portion of the reinforcement member 30. The other end of the reinforcement 31 is inserted into an opposite opening 3b (not shown) of the seat back frame 3a to be diagonally fixed to the seat back frame 3a.

One end of the seat belt 34 is fixed to a belt anchor (not shown). The other end of the seat belt 34 is connected to a belt retractor 33. A mounting bracket 35 is mounted on the reinforcement member 31. The mounting bracket 35 is connected to a belt retractor 33 through a pin 36. The belt retractor 33 winds the seat belt 34 when the force which exceeds a predetermined strength is applied to the seat back 3.

In case of collision, the force which is applied to the seat belt 34 is transmitted to the upper arms 2, 72, 82 through the belt supporting member 32 and the seat back frame 3a since the belt supporting member 32 is mounted on the seat back frame 3a.

As shown in FIG. 5, a link member 40 is disposed between the left sides of the seat cushion frame 1a and the seat back frame 3a. The link member 40 is fixed to the seat cushion frame 1a by bolts 56, 57 and rotatably connected to the seat back frame 3a about an axis 58.

Operation of the seat reclining mechanism 300 will now be described. In FIG. 2, each of the pawl members 8 is radially pressed by engagement of the cam surface 8b and the convex lobe portion 9a so that the tooth portion 8a of the pawl member 8 may be meshed with the tooth portion 23a of the ratchet 23. Therefore, the upper arm 2 cannot be inclined relative to the lower arm 4.

When the control shaft 5 is rotated in the clockwise direction in FIG. 2, the cam member 9 is rotated in the clockwise direction in FIG. 2. Therefore, the cam surface 8b of the pole member 8 is disengaged from the convex lobe portion 9a of the cam member 9 and the arm portion 9b of the cam member 9 is engaged with the cam channel 8c to slide the pawl member 8 in the direction of the control shaft 5.

Therefore, the tooth portion 8a of the pawl member 8 is disengaged from the tooth portion 23a of the ratchet 23 in order that the upper arm 2 can be rotated relative to the lower arm 4 about the control shaft 5 (The upper arm 2 is guided by the guide mechanism 10).

When the control shaft 5 is released after the upper arm 2 is rotated relative to the lower arm 4 with an angle, the control shaft 5 is rotated in the counter clockwise direction in FIG. 2 by the elastic force of the spring 11. Therefore, each of the pawl members 8 is slid in the direction of the ratchet 23 in order to engage the tooth portion 8a of the pawl member 8 with the tooth portion 23a of the ratchet 23 again. Consequently, the upper arm 2 can not be inclined relative to the lower arm 4.

Operation of the seat reclining mechanisms 400, 500 is generally the same as that of the seat reclining mechanism 300. Thus, a detailed description of the operation of the seat reclining mechanisms 400, 500 is omitted.

When the release lever 70 is operated, the control shaft 75 is rotated to rotate the cam members 79, 89 together in a counter clockwise direction in FIG. 7. At this instant, the pawl members 78a, 78b, 88a, 88b are simultaneously disengaged from the ratchets 74f, 84f of the seat reclining mechanisms 400, 500. The control shaft 75 can simultaneously operate the seat reclining mechanisms 400, 500. Further, the rotation of the control shaft 75 is transmitted to the seat reclining mechanism 300 through the connecting shaft 61.

When the pawl members 8, 78a, 78b, 88a, 88b are disengaged from the ratchets 23, 74f, 84f of the seat reclining mechanisms 300, 400, 500, the seat back frame 3a is rotatable relative to the seat cushion frame 1a. At this time, the link member 40 is rotated about the axis 58. Further, the link member 60 is rotated in the counter clockwise direction in FIG. 5. Therefore, the seat cushion frame 1a is moved in a forward direction to incline the seat back frame 3a relative to the seat cushion frame 1a.

When the operation of the control shaft 75 is terminated, the pawl members 8, 78a, 78b, 88a, 88b are reengaged with the ratchets 23, 74f, 84f of the seat reclining mechanisms 300, 400, 500 by an elastic force of the spiral spring 95 again to prevent the upper arms 2, 72, and 82 from being rotated relative to the lower arms 4, 74, and 84.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A seat reclining device comprising:

a lower arm connectable to one of opposite sides of a seat cushion;

an upper arm connectable to the lower arm and to one of opposite sides of a seat back capable of inclination relative to the lower arm;

a pair of seat reclining mechanisms on the other of the opposite sides of the seat cushion and seat back, each of the pair of seat reclining mechanisms including an opposite lower arm connectable to the other side of the seat cushion, an opposite upper arm connectable to the other side of the seat back and capable of inclination relative to the opposite lower arm; and a control shaft is inserted through the opposite lower arms and the opposite upper arms;

each of the pair of seat reclining mechanisms including a cam member connected to and for rotation with the control shaft, and a pawl member slidably disposed in one of the opposite lower arm and the opposite upper arm, the pawl member abutting the cam member to be slid by the rotation of the cam member, and the pawl member being engageable with a ratchet portion on the other of the opposite lower arm and the opposite upper arm.

2. A seat reclining device as recited in claim 1, further comprising a supplementary control shaft connected to the control shaft, a supplementary cam member connected to the supplementary control shaft to be rotated with the supplementary control shaft and a supplementary pawl member slidably disposed in one of the lower arm and the upper arm, the supplementary pawl member abutting on the supplementary cam member to be slid by the rotation of the supplementary cam member, the supplementary pawl member being engageable with a supplementary ratchet portion disposed on the other of the lower arm and the upper arm.

* * * * *